J. STROBECK.
Mode of Churning Butter.
No. 71,082.
Patented Nov. 19, 1867.
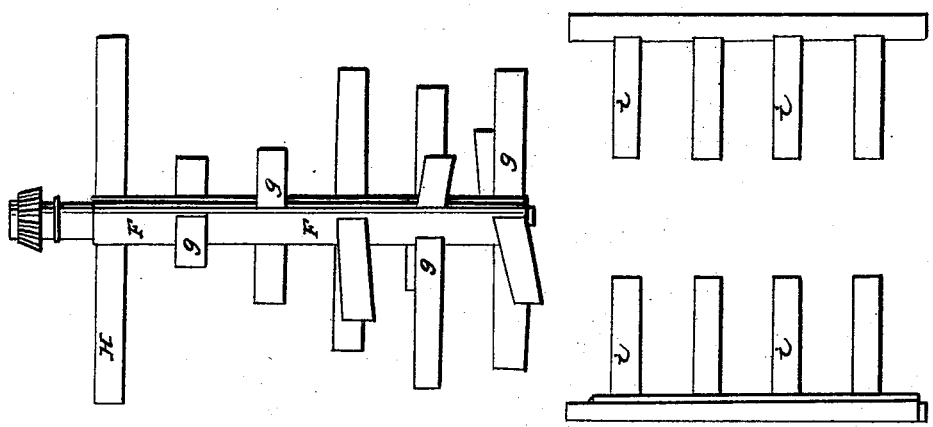
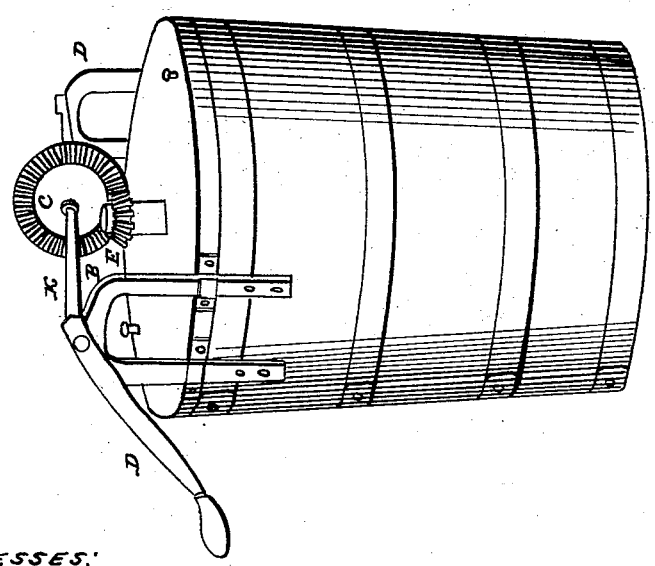
WITNESSES:
Edward Craig
J. A. Vande
INVENTOR.
Jacob Strobeck

United States Patent Office.

JACOB STROBECK, OF PARISHVILLE, NEW YORK.

Letters Patent No. 71,082, dated November 19, 1867.

IMPROVEMENT IN MODE OF CHURNING BUTTER.

*The Schedule referred to in these Letters Patent and making part of the same.*

TO ALL WHOM IT MAY CONCERN:

Be it known that I, JACOB STROBECK, of the town of Parishville, county of St. Lawrence, and State of New York, have invented a new and improved Way or Mode of Churning Butter, Cream, or Milk, and working the butter of the same when churned; and I do declare that the following is a full and exact description of the said invention, as far as I can give the same, to wit:

First, a churn or tub is made, composed of staves, with a bottom and cover, and well hooped. On each side of said churn or tub is a stirrup or handle, which is attached to the outside of the churn, marked B B. In these stirrups or handles B B the shaft K, with the driving-wheel C, rests, and is driven by the handle D attached to one end thereof. Under this shaft is the pivot-wheel E, attached to an upright shaft, F, which passes through the centre of the cover and tub, and revolves in the same. Passing through the shaft F are circular floats $g\,g\,g\,g\,g\,g$, attached to the shaft and revolving with the same, and passing between breakers attached to the inside of the churn or tub. These floats $g\,g\,g\,g\,g\,g$ pass spirally through the shaft F, and are so constructed as to revolve the cream outward and upward when in motion. Also, passing through the shaft F is a scraper, H, near the cover, and which revolves with the same, and scrapes the cream from the cover of the churn when churning. Within, and attached to the sides of the churn, are breakers $i\,i\,i\,i$, &c., which pass between the floats $g\,g\,g\,g\,g\,g\,g\,g$ as they revolve, and break the cream when churning. These breakers are crescent or circular in form, and are so attached to the churn that they can be readily removed therefrom for the purpose of gathering the butter or cleaning the churn.

For the purpose of gathering the butter, the breakers $i\,i\,i\,i$, &c., are removed from the churn, and the shaft F revolved in the opposite direction from which it is driven when churning. The peculiar construction of the floats $g\,g\,g\,g\,g\,g$, and the peculiar way in which they are placed in said shaft F, collects and gathers the butter together; reference also being had to the annexed and accompanying drawings, and which constitute and form a part of the specification in this claim.

I claim the construction and application of the scraper H, the arrangement of the breakers $i\,i\,i\,i$, with the means of adjustment and form of the dasher-blades and mode of attachment to the shaft F, in combination, as shown and described.

JACOB STROBECK.

Witnesses:
HARVEY ROBINSON,
JULIUS STROBECK.